March 13, 1962     E. H. CARRUTHERS     3,024,907
MACHINE FOR SEPARATING LEAVES AND VINES FROM
PODS OF POD TYPE VEGETABLES Filed June 30, 1955     2 Sheets-Sheet 1

INVENTOR.
EBEN H. CARRUTHERS
BY
ATTORNEY

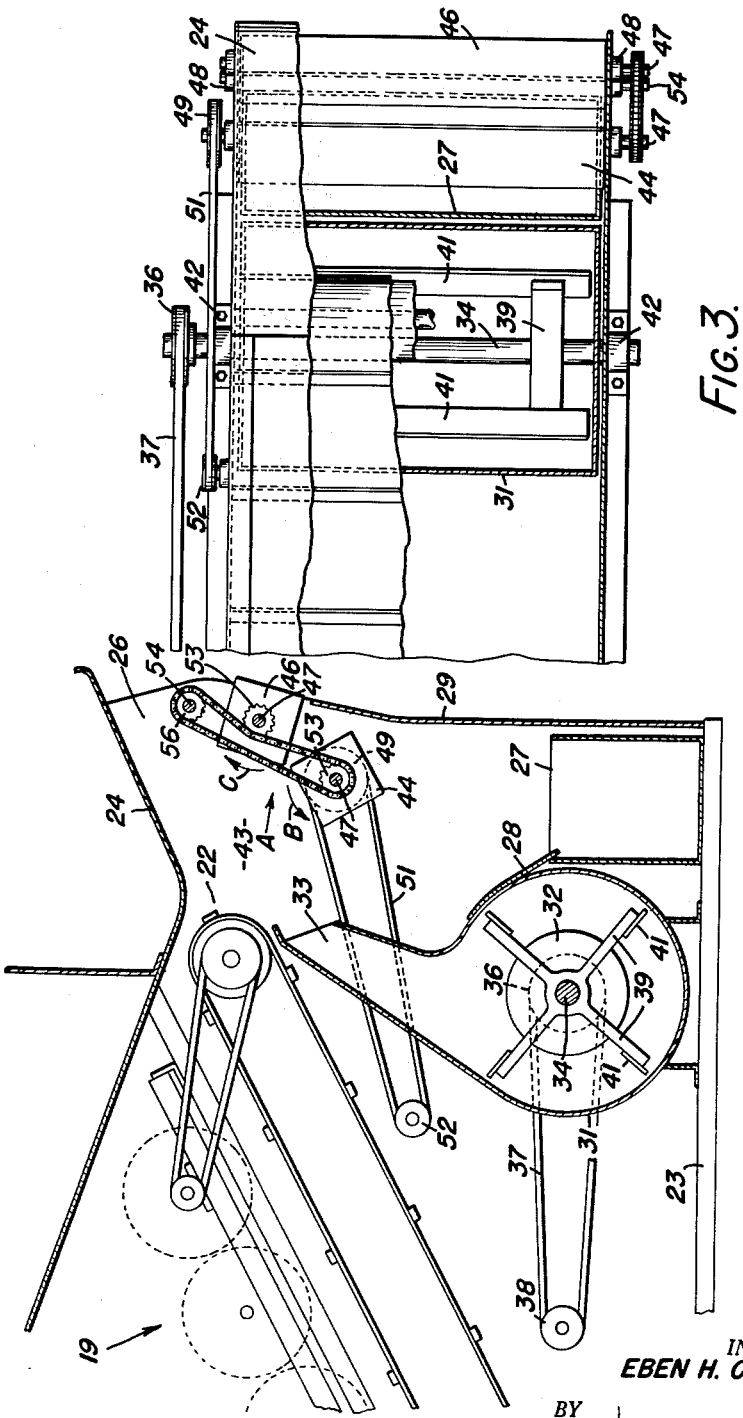

United States Patent Office 3,024,907
Patented Mar. 13, 1962

3,024,907
MACHINE FOR SEPARATING LEAVES AND VINES FROM PODS OF POD TYPE VEGETABLES
Eben H. Carruthers, Warrenton, Oreg., assignor to Chisholm-Ryder Co., Inc., Niagara Falls, N.Y., a corporation of New York
Filed June 30, 1955, Ser. No. 519,090
4 Claims. (Cl. 209—136)

My invention relates to a method and a machine for use in a harvesting machine for pod type vegetables, the invention herein contemplated residing in the means for separating the leaves and vines from the pods. Reference is made to my copending application Serial No. 336,507 filed February 12, 1953, now forfeited, entitled "A Machine for Cutting and Separating the Pods From the Stems and Leaves of Pod Type Vegetables" and my copending application Serial No. 423,136 filed April 14, 1954, issued as Patent No. 2,763,114, on September 18, 1956, entitled "Method and Machine for Harvesting Pod Type Vegetables, Cutting and Separating the Pods From the Stems and Leaves and Preparing the Vegetable for Canning or Freezing."

An object of my invention is to provide in a machine of the type shown in the above mentioned applications, an improved method and means for separating the vines and leaves that have been cut from the pods from the pods, so that the vines and leaves are deposited in one place of disposition or collection and the pods, substantially free of vines and leaves, are deposited in another place of disposition or collection.

Another object of my invention is to provide a means of separating leaves and vines of low specific gravity from pods of higher specific gravity which have been cut from the leaves and vines to the end that more complete separation is attained.

My invention further contemplates a machine wherein an air stream is directed into a space of separation into which material to be separated is conveyed to effect separation and discharge of lighter material to a place of separation at one elevation and to effect separation and discharge of heavier material to a place of separation at a lower elevation, there being located between said places of separation at least a pair of members rotatable in a direction such as to direct material discharged between said places of separation back into the air stream for the purpose of securing more complete separation.

Other objects and advantages of my invention etc. in which:

FIG. 2 is a view partly in section showing the separating mechanism; and

FIG. 3 is a top plan view of FIG. 2 with parts broken away better to illustrate the invention.

Figure 1:
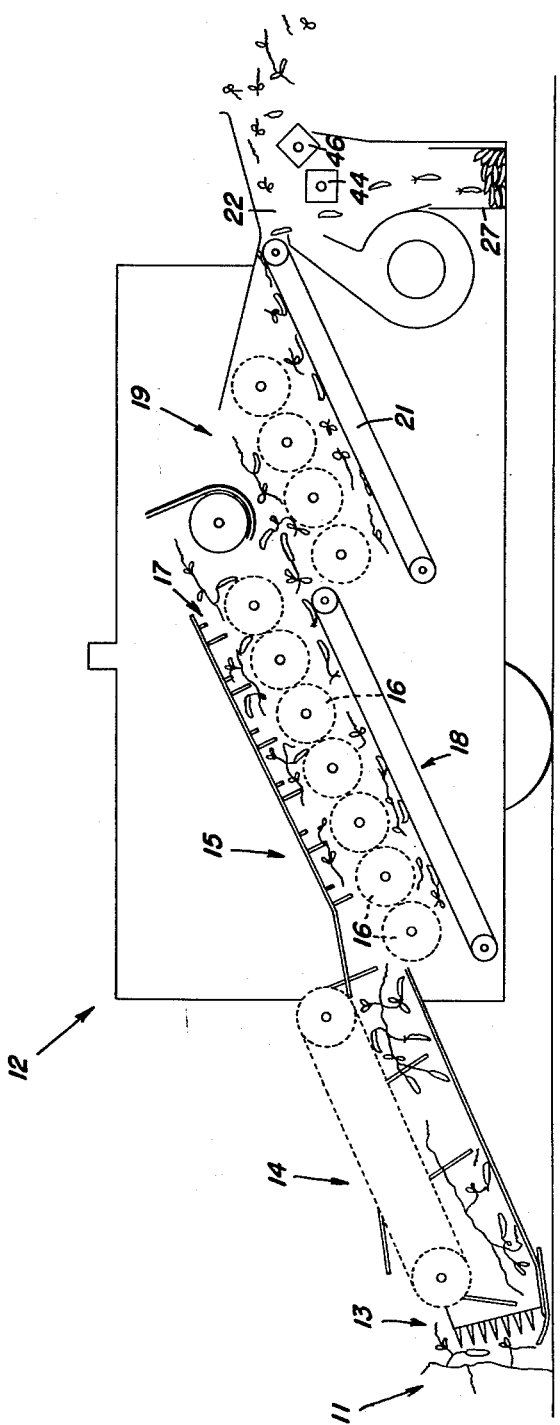
FIG. 1 is a schematic view of the method and machine of above mentioned application Serial No. 423,136 showing the flow of material through the machine.

As more fully described in the above mentioned copending application Serial No. 423,136, peas growing in the field, as indicated by the numeral 11, are harvested by a conveyance movable through the pea fields and generally indicated by the numeral 12. The conveyance carries a sickle bar assembly, generally indicated by the numeral 13, for cutting the stems of the peas adjacent the ground level. The cut vines with the leaves and pods thereon are picked up after being cut, by a rake finger assembly generally indicated by the numeral 14. The rake finger assembly acts as a conveyor to convey the material to a cutter disc assembly, generally indicated by the numeral 15.

The cutter disc assembly or cutterbed comprises a plurality of parallel rotatable shafts having cutter discs 16 mounted thereon and stationary snipper or cutter elements (not shown) cooperating with the cutter discs to snip the vines as the vines, leaves and pods are carried by the cutter discs upward through the cutter bed. The cutter disc assembly also includes a rake finger assembly, generally indicated by the numeral 17, and a conveyor, generally indicated by the numeral 18, for conveying material such as is cut finely enough to drop through the cutter bed to a second cutter bed assembly, generally indicated by the numeral 19. Material passing downward through the second cutter bed 19, drops onto a conveyor 21 and is discharged therefrom as indicated at 22.

All of the above is described in the above copending application Serial No. 423,136. It is sufficient to state herein that the material arrives in the area 22 after a multiplicity of cutting actions have been performed on the leaves and vines to the end that the leaves and vines are, for the most part, in a relatively finely divided condition and the pods are essentially free of vines.

While the separating mechanism shown in the above mentioned copending application Serial No. 423,136 will accomplish separation of the pods from the leaves and vines to a major extent, the present invention contemplates improvements in the separation method and means whereby more nearly complete separation can be attained.

The improved separation means is shown in FIGS. 2 and 3 and comprises a sheet metal assembly mounted on the frame 23 of the machine. Sheet metal assembly comprises an upper guard 24 for confining the material against upward movement and aiding in directing the lighter material toward an outlet or place of collection 26. The lighter material may be deposited back on the ground or may be discharged into trucks and used as ensilage. The heavier material, the pods with the peas therein, may be deposited in a container 27 for subsequent removal to a canning or freezing plant. The sheet metal assembly includes a guard 28 and a rear wall 29 for aiding in directing the pods into the container 27.

Mounted on the frame 23 is a blower casing 31 which has a central air intake opening 32 and a discharge 33. A shaft 34 has a pulley 36 mounted thereon over which a belt 37 passes. The belt also passes over a pulley 38 which is driven from the main drive shaft of the machine as more fully described in the above mentioned copending application.

The shaft 34 has a plurality of fan blades which may take any suitable form. For purposes of illustration, we have shown a plurality of arms 39 which merge into a central hub carried by the shaft. The arms 39 carry a plurality of transversely extending paddle like air propelling blades 41. It will be understood that the shaft 34 is journalled in suitable bearings as shown in FIG. 3 at 42 and that a set of supporting arms 39 is located on each side of the machine with the blades or vanes extending between them.

It will now be apparent that the air stream issuing from the discharge 33 and the material to be separated being discharged from the conveyor 21 adjacent the point 22 results in a turbulent action of the material in the space 43 so that the lighter vines and leaves are directed toward the place of separation 26, while the heavier pods tend to drop through the flowing stream of air into the place of separation 27.

At times the material flows in large quantities off the end of the conveyor adjacent to point 22 and the volume of air issuing from the discharge outlet 33 is insufficient to attain essentially complete separation. Moreover, occasionally a pod carries a relatively large stem with leaves thereon issues over the end of the conveyor giving it greater buoyancy than when the leaves and vines have been cut substantially clean from the pod. Under either of these conditions, material tends to be directed in the direction of the arrow A.

I have found with the mechanism shown in the above mentioned application, that at times a considerable quantity of pods are discharged through 26 while a considerable quantity of vines and leaves drop into the container 27. It is desirable that the number of pods discharged through 26 be maintained at a minimum. If the machine has not accomplished full cutting of the vines and leaves from the pods it is desirable that this material be discharged into the container 27 so that the vines and leaves may be removed from the pods by a handpicking operation.

To the above ends, I have found that better separation can be secured by providing between the places of separation 26 and 27 devices for batting or returning the material which tends to discharge between the places of separation back into the air stream. For this purpose a pair of polygonal members 44 and 46 are mounted between the places of separation 26 and 27. The polygonal members 44 and 46 are mounted on shafts 47 which are journalled in the frame of the machine as shown at 48. The lower one of the shafts 47 has a pulley 49 mounted thereon which is driven by a belt 51 which also passes over a pulley 52. This pulley is driven in any suitable manner from the main drive shaft of the machine. Each of the shafts 47 carries a sprocket 53.

A third shaft 54 extends across and is journalled in the frame of the machine and carries a sprocket 56. A chain passes around the lower sprockets 53 and sprocket 56 so as to drive all three sprockets. The purpose of employing three sprockets is so as to reverse the direction of rotation of the upper sprocket 53. It will now be appreciated that the polygonal members 44 and 46 rotate in opposite directions as indicated by the arrows B and C with the lower edge of upper member 46 and the upper edge of lower member 44 moving in a direction opposite to the movement of the material as indicated by arrow A. Thus, the polygonal faces presented to the oncoming material are rotating in a direction such as to bat the material back into the air stream.

Further upon examination of the drawings it will be seen that the polygonal members 44 and 46 are out of phase with each other so that the space or clearance between them can be reduced to a minimum. Actually no clear flow space exists as the shafts 47 are mounted in a relationship spaced such that a radius from the shafts to the corners of the polygons is greater than one-half the distance between the shafts 47. With the polygons rotating out of phase, as shown, they will clear each other and still obstruct the free flow of material between them. By continuously batting the material back into the air stream, I have found that more complete air separation is obtained and a reduction of the pods lost through the opening 26 occurs to an extent such that almost all pods with peas therein are recovered.

While I have shown the preferred method and means of my invention it would be apparent that various modifications and changes may be made therein particularly in the form and relation of parts without departing from the spirit of the appended claims.

I claim:
1. A machine for separating material of different specific gravities comprising, in combination, a walled housing having a part of the interior thereof defining a separation space, means for delivering the material to be separated into said housing and into the separation space from one side thereof, said material upon delivery being free to fall by gravity through the housing, means for directing a flow of air in an upward direction from below the separation space and in manner such that the air flow tends to oppose the action of gravity on said material, blocking means on the opposite side of said separation space from the point of delivery of the material to the separation space and out of the path of travel of major portions of the delivered material, said housing having a part above the separation space and above the blocking means for delivery of material of lesser specific gravity and a part below the separation space and below the blocking means for delivery of material of higher specific gravity and means for rotating said blocking means so that material that crosses the separation space from the delivery means to the blocking means is directed back into the separation space.

2. A machine in accordance with claim 1 in which said rotatable means comprises at least a pair of rotatable members spaced closely with respect to each other, each of said members being polygonal in shape and rotatable in directions such as to oppose the passage of material between them, said polygonal members being out of phase with each other so that the clear space between them through which material may pass is a minimum.

3. A machine in accordance with claim 1 in which said blocking means comprises at least a pair of rotatable members and means for rotating said rotatable members in opposite directions toward the separation space when considered along a line between them directed toward the separation space.

4. A machine for separating material of different specific gravities wherein the material is delivered to an area of separation at one side thereof comprising, in combination, means for creating a flow of air in said area of separation to deliver the material of lesser specific gravity to a place at one elevation and the material of higher specific gravity to a place at a lower elevation, said material being delivered to said place of separation so that it tends to fall by gravity, said flow of air being directed from beneath the point of delivery of said material into said area so that the flow of air tends to oppose the action of gravity and rotatable means on the side of said place of separation opposite to the side of delivery of the material and between said places of elevation for directing material engaging therewith back to the place of separation, said rotatable means comprising at least a pair of rotatable members spaced closely with respect to each other, each of said members being polygonal in shape and rotatable in directions such as to oppose passage of material between them, said polygonal members being out of phase with each other so that the clear space between them through which material may pass is a minimum.

References Cited in the file of this patent

UNITED STATES PATENTS

| | | |
|---|---|---|
| Re. 15,275 | Mettler | Jan. 24, 1922 |
| 11,800 | Waadword | Oct. 10, 1854 |
| 393,981 | Hunter | Dec. 4, 1888 |
| 864,164 | Hayden | Aug. 27, 1907 |
| 2,403,740 | Muench | July 9, 1946 |

FOREIGN PATENTS

| | | |
|---|---|---|
| 5,680 | Great Britain | 1881 |